(12) United States Patent
Oliva et al.

(10) Patent No.: US 6,617,410 B2
(45) Date of Patent: Sep. 9, 2003

(54) PROPYLENE COPOLYMERS CONTAINING STYRENE UNITS

(75) Inventors: Leone Oliva, Napoli (IT); Gaetano Guerra, Salerno (IT); Lucia Caporaso, Battipaglia (IT); Lorella Izzo, Salerno (IT); Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/068,361

(22) Filed: Feb. 6, 2002

(65) Prior Publication Data

US 2002/0095015 A1 Jul. 18, 2002

Related U.S. Application Data

(63) Continuation of application No. 09/673,048, filed as application No. PCT/EP00/01219 on Feb. 10, 2000, now abandoned.

(30) Foreign Application Priority Data

Feb. 11, 1999 (IT) .......................... SA99A0005

(51) Int. Cl.[7] ..................... C08F 210/06; C08F 210/02; C08F 212/08
(52) U.S. Cl. ..................... 526/347; 526/160; 526/165; 526/293; 525/242; 525/288
(58) Field of Search ..................... 526/347, 293, 526/160, 165; 525/242, 288

(56) References Cited

U.S. PATENT DOCUMENTS 5,883,213 A    3/1999    Arai et al. .................. 526/347

FOREIGN PATENT DOCUMENTS

| DE | 19711339 | 10/1997 | .......... C08F/210/02 |
| EP | 0505973  | 9/1992  | .......... C08F/212/04 |
| EP | 0718323  | 6/1996  | .......... C08F/210/18 |
| EP | 0872492  | 10/1998 | .......... C08F/12/04  |
| JP | 8269134  | 10/1996 | .......... C08F/210/06 |
| WO | 9616096  | 5/1996  | .......... C08F/210/06 |
| WO | 9809999  | 3/1998  | .......... C08F/210/02 |

*Primary Examiner*—Caixia Lu

(57) ABSTRACT

Isotactic-polypropylene-based copolymers having a homogenous distribution of recurring units of formula (1):

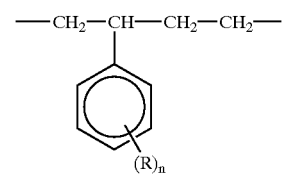

where R is a hydrogen, halide radical or a hydrocarbyl radical optionally containing an atom selected from oxygen, nitrogen, sulphur, phosphorus and silicon, and n is an integer ranging from 1 to 3; said copolymer having a $^{13}$C-NMR spectrum wherein the resonance signals attributed to the links between different monomeric units fall around 30, 34, 35, 45 and 47 ppm and present intensities at least two times higher than the resonance signals attributed to styrene—styrene sequences around 41 ppm and 44–46 ppm; a process for preparing said copolymers carried out in the presence of homogeneous catalytic systems comprising a metallocene compound and a cocatalyst; functionalized copolymers obtained from said isotactic-polypropylene-based copolymers; and graft copolymers comprising said isotactic-polypropylene-based copolymers as backbones.

11 Claims, 4 Drawing Sheets

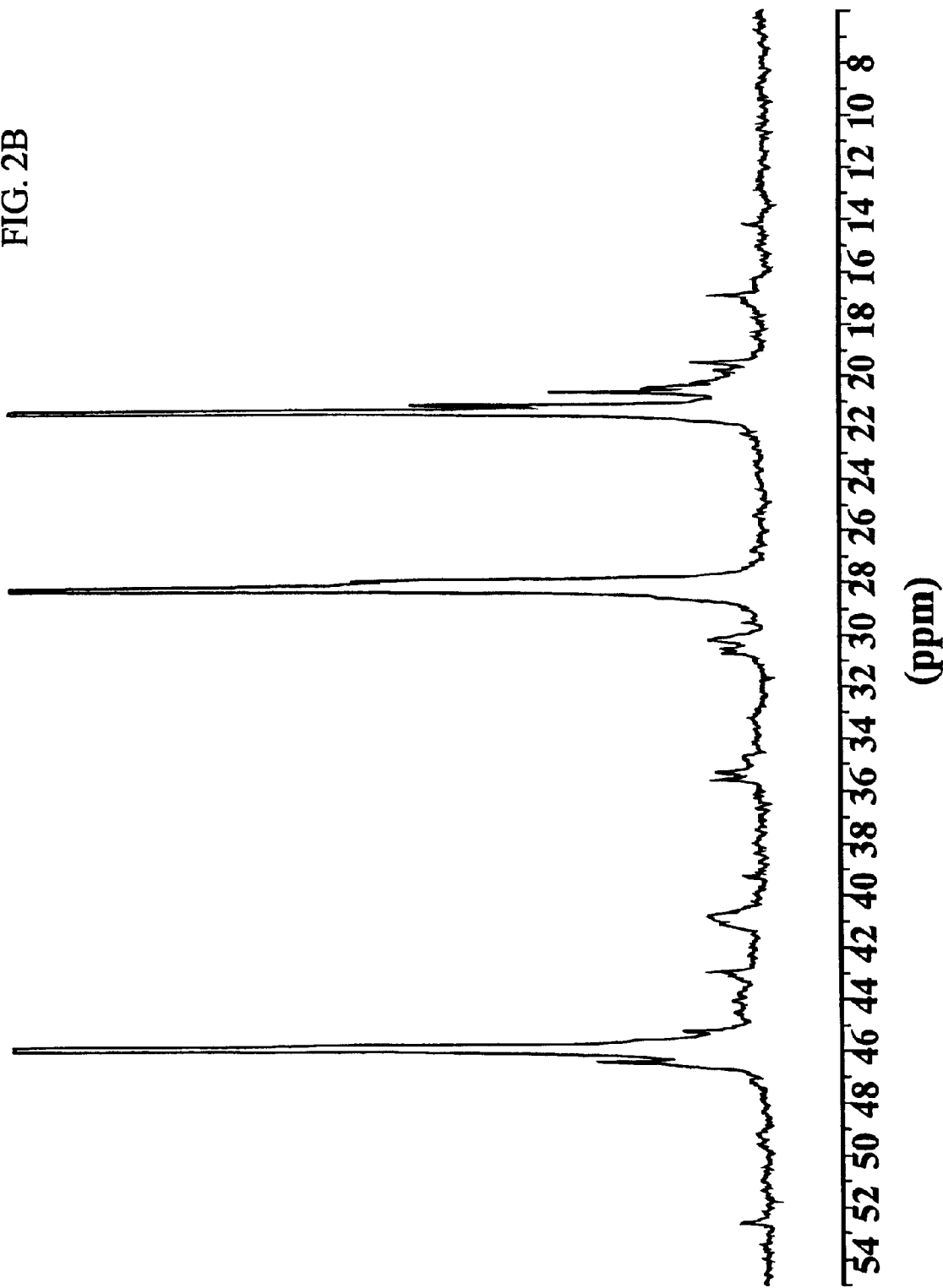

PROPYLENE COPOLYMERS CONTAINING STYRENE UNITS

This application is a continuation of Ser. No. 09/673,048, filed Dec. 11, 2000, now abandoned. Ser. No. 09/673,048 is the U.S. national phase of International Application PCT/EP00/01219, filed Feb. 10, 2000.

The present invention relates to random copolymers of propylene as main recurring units comprising recurring units deriving from styrene. The present invention also relates to functionalized copolymers and graft copolymers. The invention, moreover, relates to processes for the production of said copolymers.

The present invention lies in the technical field of the production of thermoplastic materials.

As it is well known, plastic materials based on isotactic polypropylene are among the most interesting ones from the technology viewpoint. In fact, they are not only competitive from a cost perspective, but are also suitable for various applications due to suitable chemical and physical modifications.

The chemical modification mostly used in the industry is the random copolymerisation of propylene with small amounts of one or more comonomer(s), generally ethylene or butene-1. Said modification allows to obtain materials that have a lower melting temperature (above all used for producing films with thermoweldable layers), lower stiffness, higher impact resistance at low temperatures and a higher transparency than the isotactic propylene homopolymer.

The above mentioned variations in physical properties with respect to the homopolymer are due to lower crystallinity and smaller size of crystallites caused by the comonomer units.

It is worth noting that ethylene and butene-1 recurring units have a sterical hindrance similar enough to propylene recurring units. Consequently, although they cause a decrease in packing energy, they are partially enclosed as defects in the crystalline phase. As it is well known, generally speaking, in semicrystalline polymeric materials one obtains a more efficient decrease in crystallinity and size of crystallites when one uses comonomer units with much higher hindrance than the basic monomer units, i.e. such that they have inevitably to be excluded from the crystalline phase.

In this connection, there is however the problem that hindered and cheap comonomers, such as styrene, are not easily copolymerisable with propylene, because generally catalytic sites suitable for the isotactic polymerisation of propylene are not capable of polymerising styrene and vice-versa. In fact, generally speaking, catalytic systems suitable for the polymerisation of 1-alkenes to isotactic polymers, such as metallocene- and methylalumoxane-based catalysts, are not capable of polymerising styrene. On the contrary, styrene tends to act as a poison in such processes. It is worth noting that in case of heterogeneous catalysts, which typically contain different types of catalytic sites, it is possible to polymerise mixture of the said two monomers but mixtures of the two homopolymers are mostly obtained.

Another disadvantage of known random copolymers based on propylene produced by heterogeneous catalysts is that macromolecules do not have a homogenous content of the comonomer units, so that the fractions with a higher comonomer content are more easily extractable with solvents. This evidently limits their use for preparing articles to be used in contact with foods.

European patent application EP-A-872 492 discloses catalytic systems based on stereorigid metallocenes that contain a metallic atom belonging to the IV group of the Periodic Table and whose substituted cyclopentadienyl groups are bridged through a single atom. Said metallocenes are capable of copolymerising olefins with vinyl aromatic compounds. As disclosed in the patent application, such catalyst systems, however, produce copolymers containing blocks of styrene units. This is, for instance, shown by the Nuclear Magnetic Resonance spectrum of FIG. 29, therein.

It has now been produced a random copolymer of propylene that has a homogeneous distribution of recurring units deriving from styrene in the polymer chain.

Thanks to the homogeneous distribution of the styrene recurring units in the polymer chain, the copolymers of the instant invention essentially show no variation of the glass transition temperature compared with isotactic polypropylene. For example, in the case of propylene copolymers of the present invention, no increase of the glass transition temperature higher than 10° C. compared with isotactic polypropylene is observed, e.g., if the $T_g$ is measured by Differential Scanning Calorimetry at a rate of 10° K per minute, its value does not exceed 0° C.

It is important to note that possible random copolymers of propylene with styrene or substituted styrenes would present a substantial increase of the glass transition temperature ($T_g$) in comparison with the propylene homopolymer, approximately according to the Fox relation:

$$1/T_g = W_{prop}/T_{g\ prop} + W_{styr}/T_{g\ styr}$$

where $W_{prop}$ and $W_{styr}$ are respectively propylene and styrene fractions by weight and $T_{g\ prop}$ and $T_{g\ styr}$ are respectively the glass transition temperatures of polypropylene and polystyrene homopolymers. Since the glass transition temperatures of the styrene polymers are much higher than that of polypropylene and the molecular mass of the styrenic units is much larger than that of the propylene unit, a substantial increase of the glass transition temperature should be observed also in cases of a low content by mole of the styrenic units and this would make said materials unusable in applications which demand a low running temperature.

As another advantage, some of the copolymers of the present invention can be used for preparing functionalized polypropylene as well as graft copolymers.

The present invention provides, therefore, new isotactic-polypropylene-based copolymers having a homogenous distribution of recurring units of the formula (1):

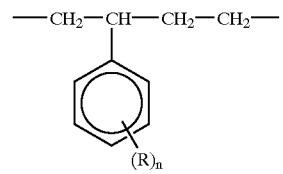

where R is a hydrogen, halide radical or a hydrocarbyl radical optionally containing an atom selected from oxygen, nitrogen, sulphur, phosphorus and silicon and n is an integer ranging from 1 to 3.

The copolymers of the present invention contain the recurring units of formula (1) preferably in amounts ranging from 0.1 to 30% by weight.

Said copolymers have a $^{13}$C-NMR spectrum wherein the resonance signals attributed to the links between different monomeric units fall around 30, 34, 35, 45 and 47 ppm and present intensities at least 2 times higher than the resonance signals attributed to styrene—styrene sequences around 41 ppm and 44–46 ppm (all chemical shifts are relative to tetramethylsilane). In particular, for the case where R of formula (1) is hydrogen, that is for styrene-ethylene comonomer units, the resonance signals attributed to the links between different monomeric units fall at 30.3, 33.9, 34.6, 44.8, and 46.9 ppm.

The polymerisation degree of the copolymers of the present invention is normally at least 50.

When R is a substituent containing carbon atoms, it can be selected from $C_1$–$C_{20}$ alkyl radicals, linear or branched, $C_3$–$C_{20}$ cycloalkyl radicals and $C_6$–$C_{20}$ aryl radicals. The alkyl radicals may be saturated or unsaturated radicals. The preferred radicals are metyl, ethyl, isopropyl, vinyl and allyl radicals.

Said substituent R may contain a functional group, such as —$NR_2$, where R is an alkyl group as above defined.

Preferably the sequences of propylene recurring units are mainly isotactic. Generally, the content of meso diads (m) is higher than 80%.

The amount of the structural units of formula (1) in the copolymer may be determined on the basis of the intensity of specific signals in the $^{13}C$ nuclear magnetic resonance spectra. For example, in the case of propylene copolymers with styrene the presence of said structural units is put in evidence by signals in the aliphatic region at 33.9 and 25.2 ppm (chemical shift from tetramethylsilane, TMS) and the molar fraction of the styrenic units ($X_s$), equal to the molar fraction of the connected ethylenic units, can be obtained by the following relation:

$$X_s = \frac{0.5 A_{33.9} + A_{25.2}}{(0.5 A_{33.9} + A_{25.2}) + (0.5 A_{33.9} + A_{25.2} + A_{24.4}) + (A_{44.8} + 0.5 A_{34.6} + A_{45.4} + 0.5 A_{36.9})}$$

where $A_x$ is the intensity of the signal at x ppm.

Depending on the polymerization conditions, random copolymers with various compositions and polymerization grades are obtained. In general the weight average molecular weight $M_w$ is between 3,000 and 1,000,000.

As said above, the copolymers of the invention have a homogeneous distribution of the comonomers. Such homogeneity is also proved by the impossibility by solvent extraction to obtain fractions of the copolymers with a $X_s$ value differing more than 50% from the $X_s$ value of the unfractionated sample.

The copolymers of the instant invention can be obtained according to the known polymerisation methods.

The copolymers can be produced by means of the homogeneous catalytic systems used for the insertion polymerization of propylene which give an isotactic homopolymer, e. g. catalytic systems based on metallocene compounds. Suitable examples of said metallocene compounds are rac-ethylene-bis(1-indenyl)-$ZrCl_2$, rac-isopropylidene-bis(1-indenyl)-$ZrCl_2$, rac-dimethylsilyl-bis(1-indenyl)-$ZrCl_2$, rac-dimethylsilyl-bis(2-methyl-1-indenyl)-$ZrCl_2$, rac-dimethylsilyl-bis (2-methyl-4-isopropyl-1-indenyl)-$ZrCl_2$, rac-dimethylsilyl-bis(2-methyl-4-phenyl 1-indenyl)-$ZrCl_2$, rac-dimethylsilyl-bis(2-methyl-benz[e]-1-indenyl)-$ZrCl_2$, rac-dimethylsilyl-bis (benz[e]-1-indenyl)-$ZrCl_2$.

Suitable activating cocatalysts according to the process of the invention are alumoxanes or compounds capable of forming an alkyl metallocene cation.

Alumoxane useful as cocatalyst may be linear alumoxanes of formula (2):

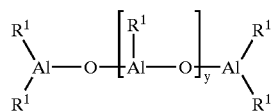

wherein $R^1$ is selected from the group consisting of halogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_2$ arylalkyl radicals and y ranges from 0 to 40; or cyclic alumoxanes of formula (3):

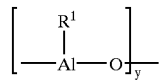

wherein $R^1$ has the meaning herein described and y is an integer ranging from 2 to 40.

The above alumoxanes may be obtained according to procedures known in the state of the art, by reacting water with an organo-aluminum compound of formula $AlR^1_3$ or $Al_2R^1_6$, with the condition that at least one $R^1$ is not halogen. In this case, the molar ratios of Al/water in the reaction are comprised between 1:1 and 100:1. Particularly suitable are the organometallic aluminum compounds of formula (II) described in EP 0 575 875 and those of formula (II) described in WO 96/02580. Moreover, suitable cocatalysts are those described in WO 99/21899 and in the European patent app. no. 99203110.4.

The molar ratio between aluminum and the metal of the metallocene is comprised between about 10:1 and about 5000:1, and preferably between about 100:1 and about 4000:1.

Examples of alumoxanes suitable as activating cocatalysts in the process of the invention are methylalumoxane (MAO), tetra-isobutyl-alumoxane (TIBAO), tetra-2,4,4-trimethylpentylalumoxane (TIOAO) and tetra-2-methyl-pentylalumoxane. Mixtures of different alumoxanes can also be used.

Not limiting examples of aluminum compounds of formula $AlR^8_3$ or $Al_2R^A_6$ are: tris(methyl)aluminum, tris (isobutyl)aluminum, tris(isooctyl)aluminum, bis(isobutyl) aluminum hydride, methyl-bis(isobutyl)aluminum, dimethyl (isobutyl)aluminum, tris(isohexyl)aluminum, ris(benzyl) aluminum, tris(tolyl)aluminum, tris(2,4,4-trimethylpentyl) aluminum, bis(2,4,4-trimethylpentyl)aluminum hydride, isobutyl-bis(2-phenyl-propyl)aluminum, diisobutyl-(2-phenyl-propyl)aluminum, isobutyl-bis(2,4,4-trimethyl-pentyl)aluminum, diisobutyl-(2,4,4-trimethyl-pentyl) aluminum, tris(2,3-dimethyl-hexyl)aluminum, tris(2,3,3-trimethyl-butyl) aluminum, tris(2,3-dimethyl-butyl) aluminum, tris(2,3-dimethyl-pentyl) aluminum, tris(2-methyl-3-ethyl-pentyl)aluminum, tris(2-ethyl-3-methyl-butyl) aluminum, tris(2-ethyl-3-methyl-pentyl)aluminum, tris(2-isopropyl-3-methyl-butyl) aluminum and tris(2,4-dimethyl-heptyl)aluminum.

Particularly preferred aluminum compounds are trimethylaluminum (TMA), tris(2,4,4-trimethylpentyl) aluminum TIOA), triisobutylaluminum (TIBA), tris(2,3,3-trimethyl-butyl) aluminum and tris(2,3-dimethyl-butyl) aluminum.

Mixtures of different organometallic aluminum compounds and/or alumoxanes can also be used.

In the catalyst system used in the process of the invention, both said metallocene and said alumoxane can be pre-reacted with an organometallic aluminum compound of formula $AlR^1_3$ or $Al_2R^1_6$, wherein $R^1$ has the meaning reported above.

Further activating cocatalysts suitable in the catalysts of the invention are those compounds capable of forming an alkylmetallocene cation. Examples are boron compounds tetrakis-pentafluorophenyl-borate is particularly preferred. Moreover, compounds of formula $BAr_3$ can be conveniently used.

The catalysts of the present invention can also be used on an inert support, by depositing the metallocene, or the reaction product of the metallocene with the cocatalyst, or the cocatalyst and successively the metallocene, on the inert support, such as silica, alumina, magnesium halides, olefin polymers or prepolymers (i.e. polyethylenes, polypropylenes or styrene-divinylbenzene copolymers). The thus obtained supported catalyst system, optionally in the presence of alkylaluminum compounds, either untreated or pre-reacted with water, can be usefully employed in gas-phase polymerization processes. The solid compound so obtained, in combination with further addition of the alkyl aluminum compound as such or prereacted with water, is usefully employed in gas phase polymerization.

The molecular weight of the polymers can be varied by changing the polymerization temperature or the type or the concentration of the catalyst components, or by using molecular weight regulators, such as hydrogen, as well-known in the state of the art.

The polymerization process according to the present invention can be carried out in gaseous phase or in liquid phase, optionally in the presence of an inert hydrocarbon solvent either aromatic (such as toluene), or aliphatic (such as propane, hexane, heptane, isobutane and cyclohexane).

The polymerization temperature ranges from about 0° to about 250° C., preferably from 20° to 150° C., and more preferably from 40° to 90° C.

The molecular weight distribution can be varied by using mixtures of different metallocenes or by carrying out the polymerization in various steps differing in the polymerization temperature and/or in the concentration of the polymerization monomers.

The polymerization yield depends on the purity of metallocenes in the catalyst; the metallocene according to the present invention may be used as such or may be previously subjected to purification treatments.

The metallocene and cocatalyst can be contacted with each other before the polymerization. The contact time can be between 1 and 60 minutes, preferably between 5 and 20 minutes. The precontact concentrations for the metallocene are between $10^{-2}$ and $10^{-8}$ mol/l, whereas for the cocatalyst they are between 10 and $10^{-3}$ mol/l. The precontact is generally carried out in the presence of a hydrocarbon solvent and, optionally, of small amounts of monomer.

The copolymerization of propylene and styrene is carried out in the presence of small amounts of ethylene. In particular, propylene concentration may be between 0.1 M and 13 M, styrene concentration between $10^{-3}$ M and 9 M, ethylene concentration less than one tenth of the propylene concentration, catalyst concentration between $10^{-8}$ M and $10^{-2}$ M. The polymerisation temperature is between −30° C. and +150° C., preferably between 0° C. and 100° C.

The copolymers of the present invention can be blended with other polymers, preferably with isotactic propylene polymers.

Such polymer blends can be prepared by mechanically blending the polymers at the softening temperature, preferably at the melting temperature, of the polymers.

Alternatively, the blend can be carried out by way of a polymerisation that can be carried out in at least two sequential steps, wherein the polymers are prepared in separate subsequent steps, operating in each steps, except in the first step, in the presence of the polymer formed in the preceding step. The catalyst can be the same in all the steps or different. For instance, a Ziegler-Natta catalyst can be used in the first step, while said homogeneous catalyst systems can be used in the subsequent step(s).

The present invention also provides functionalized copolymers. As said above, the copolymers of the present invention are particularly useful for producing functionalized copolymers, which are technologically important to improve their adhesion to and compatibility with other materials. In fact, the comonomeric units of formula (1) can be functionalized under various free radical, anionic and cationic processes, as described in the open and patent literature for random copolymers between ethene and styrene or substituted styrenes. For instance, benzylic protons can be oxidated, halogenated or metallated, to form desirable functional groups (COOH, $CH_2X$, and $CH_2Mt$, respectively) bonded to the phenyl rings.

Moreover, benzylic protons can be interconverted to stable anionic initiators for graft polymerizations. In particular, the metallated polymer (mainly lithiated) can be suspended in an inert organic diluent before addition of monomers, such as styrene, substituted styrenes, vinyl acetate, methylacrylate, methylmethacrylate, acrylonitrile. This procedure can be particularly relevant for the preparation of graft copolymers presenting polystyrene branches onto isotactic polypropylene backbones.

Another object of the present invention is the graft copolymers comprising isotactic-polypropylene-based copolymers as backbones. Examples of graft copolymers of the present invention are polystyrene or polyvinylacetate or polymethacrylate or polymethylmethacrylate or polyacrylonitrile grafted onto isotactic polypropylene.

Said graft copolymers can be obtained by the method mentioned above.

These graft copolymers are mainly useful as compatibilizers in the preparation of normally incompatible polymer blends or alloys.

Examples of polymers to be blended with the propylene polymers in the presence of the graft copolymers are polystyrene, polyether, polyacrylate, such as polymethylacrylate.

The following examples are given just to illustrate the instant invention and not to limit its scope.

EXAMPLE 1

In a three necked 100 ml pyrex glass flask kept at −25° C. are introduced, in a nitrogen atmosphere, in the following order: styrene (30 ml) and methylalumoxane (MAO) (300 mg); after removing the nitrogen, the liquid phase is saturated by bubbling a propylene/ethylene mixture (20/1 mol/mol) through it at atmospheric pressure, setting the flow at 0.3 liter per minute.

The reaction is started by injecting in the flask 3 mg of rac-ethylene-bis(1-indenyl) $ZrCl_2$ catalyst dissolved in 2 mL of anhydrous toluene.

After a reaction time of 4 hours, the produced polymer is coagulated in 200 mL of ethanol acidified with HCl, filtered and dried in a vacuum oven.

The yield is of about 120 mg.

BRIEF DESCRIPTION OF DRAWINGS

From the $^{13}$C-NMR analysis (FIGS. 1 and 1B) the product results to be composed of 76% by moles of propylene units and 12% by moles of styrene units and 12% by moles of associated ethylene units ($X_s$=0.12), while significant amounts of blocks of styrene units are not observed.

Figure 1:
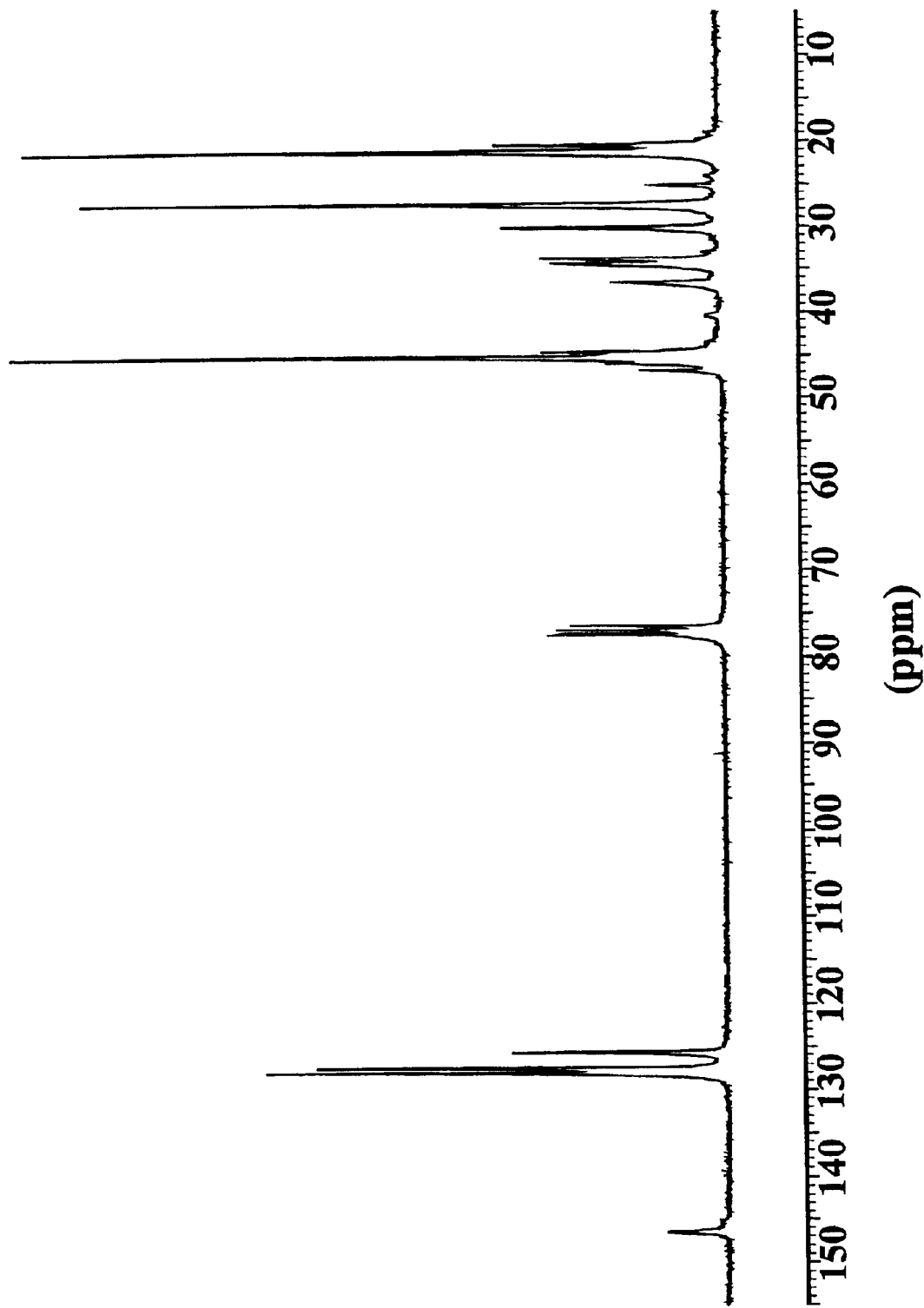
FIG. 1B shows that the resonance signal at about 41 ppm, which are attributed to the styrene—styrene sequences, is nearly 6 times less intense than the resonance signal at 30.3 ppm and nearly 3 times less intense than the resonance signals at 33.9, 34.6, 44.8, and 46.9 ppm, all attributed to the links between different monomeric units. This fact confirms the statistical nature of the obtained product.
Figure 1B:
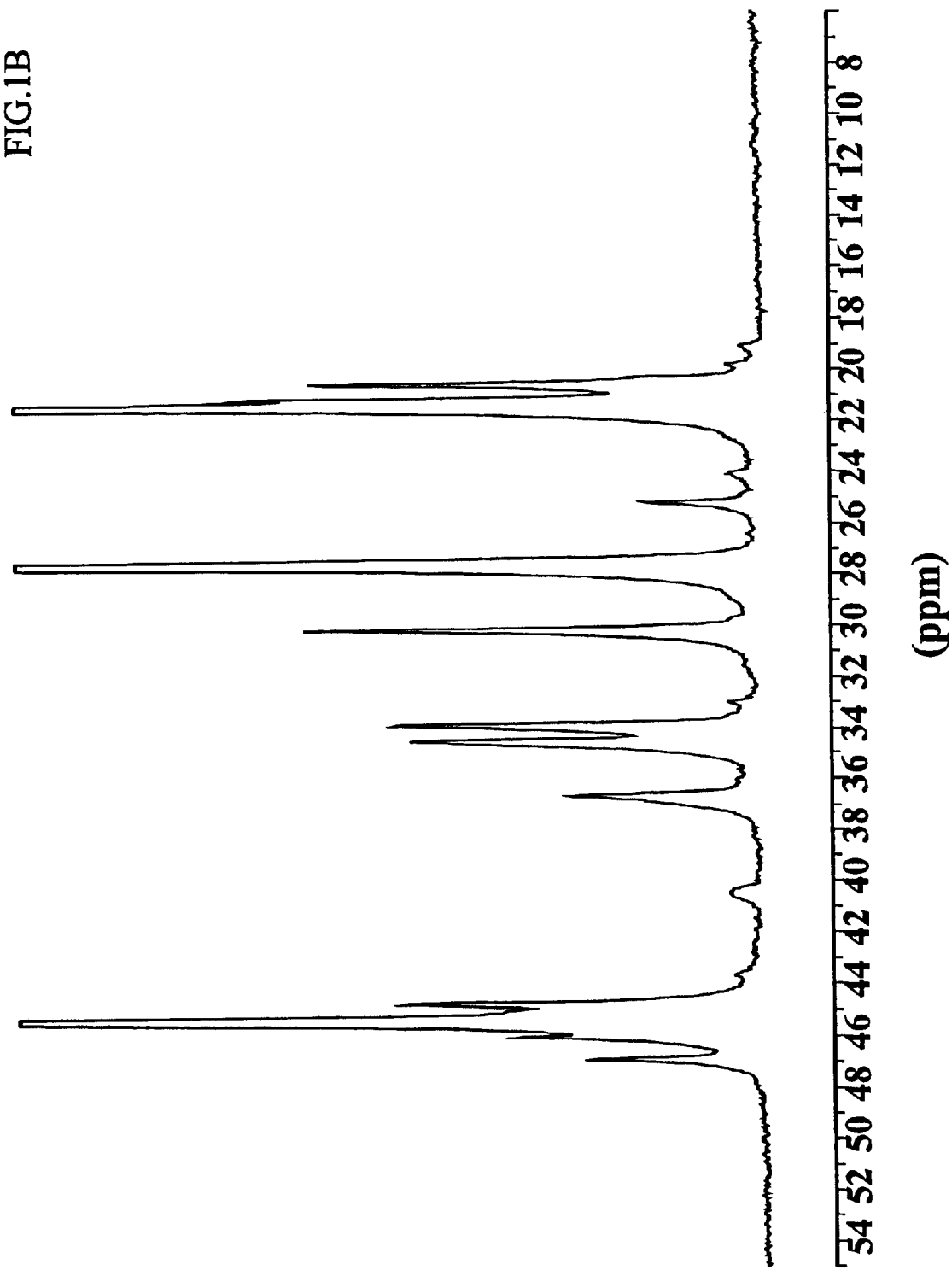

From differential scanning calorimetric analysis, carried out at a scanning rate of 10 K/min, the polymer is characterized by a melting temperature of 79° C. ($\Delta H_f$=10 J/g) and a $T_g \approx -9°$ C.

The weight average molecular mass measured by gel permeation chromatography is of 3 ×10³ u.m.a.

COMPARATIVE EXAMPLE 1

A propylene-styrene polymerization is carried out with a catalyst system of the same kind as those described in the previously cited Arai et al. patent.

In a three necks 100 mL pyrex glass flask kept at 50° C. are introduced, in nitrogen atmosphere, in the order: toluene (30 mL), styrene (5 mL), methylalumoxane (MAO) (600 mg) and triisobutylaluminum (0.4 mL); after removing the nitrogen, the liquid phase is saturated by causing propylene to bubble at atmospheric pressure, setting the flow at 0.3 L per minute.

The reaction is started by injecting in the flask 5 mg of rac-isopropylidene-bis(1-indenyl) ZrCl₂ catalyst dissolved in 2 mL of anhydrous toluene.

After a reaction time of 4 hours, the produced polymer is coagulated in 200 mL of ethanol acidified with HCl, filtered and dried in a vacuum oven.

The yield is of about 320 mg.

Figure 2:
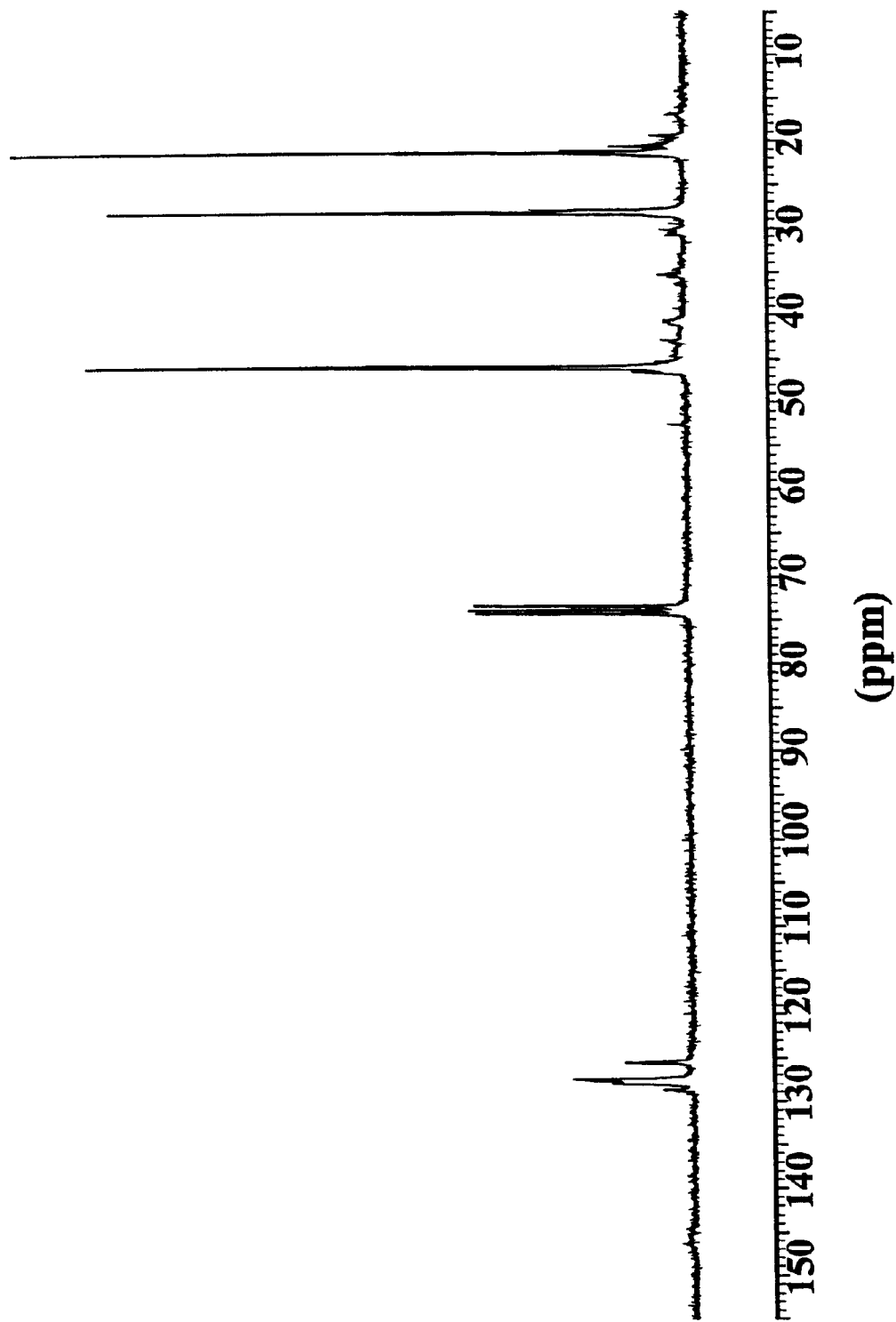

According to ¹³C-NMR analysis (FIGS. 2 and 2B), the product is composed of 8% by mole of styrene units.

FIG. 2B shows that the resonance signals at about 41 and 43 ppm, which are attributable to the styrene—styrene sequences, have intensities comparable to those of the resonance signals attributed to the links between different monomeric units, falling in the region from 30 to 38 ppm, notwithstanding the fact that the content of styrene units is lower than in the product of Example 1 (8% vs. 12%). This fact indicates the presence of blocks in the polymer.

EXAMPLE 2

The catalyst system employed, the operating method and the reaction conditions are identical with those of Example 1, except for the amounts of styrene (10 mL) and toluene (20 mL) employed.

The yield is of about 200 mg.

According to ¹³C-NMR analysis, the product is composed of 88% by mole of propylene units and 6% by mole of styrene units and 6% by mole of associated ethylene units ($X_s$=0.06).

According to differential scanning calorimetric analysis (DSC), the polymer is characterized by a melting temperature of 103° C. ($\Delta H_f$=24 J/g) and a $T_g \approx -13°$ C.

EXAMPLE 3

The reaction is carried out at 0° C. in a 250 mL autoclave containing 50 mL of toluene, 3.2 ml of styrene, 0.9 g of MAO and 9 mg of the same catalyst employed in Examples 1 and 2, by feeding a gaseous mixture of ethylene/propylene (¼ mol/mol) at 2 atmospheres.

The reaction is stopped after 1 hour and about 600 mg of product is obtained (conversion <5%).

According to ¹³C-NMR analysis, the sample is characterized by a content of styrene units of 3% by mole ($X_s$=0.03), while the content of ethylene units is 7% and is distributed among sequences of ethylene units contiguous to styrene units (3%) and sequences of ethylene units between propylene units (4%).

The melting temperature of the polymer is 124° C. ($\Delta H_f$=53 J/g) and the $T_g \approx 17°$ C.

The homogeneous distribution of the comonomers is confirmed by the extraction tests with hydrocarbon solvents: the polymer is fully soluble in boiling hexane and fully insoluble in boiling ethyl ether.

EXAMPLE 4

In a three necked 100 ml pyrex glass flask kept at −25° C. are introduced, in a nitrogen atmosphere, in the following order: toluene (28 ml), p-methylstyrene (2 ml) and methylalumoxane (MAO) (460 mg); after removing the nitrogen, the liquid phase is saturated by bubbling a propylene/ethylene mixture (124/1 mol/mol) through it at atmospheric pressure, setting the flow at 0.3 liter per minute.

The reaction is started by injecting into the flask 6 mg of rac-ethylene-bis(1-indenyl) ZrCl₂ catalyst dissolved in 2 ml of anhydrous toluene.

After a reaction time of 3 hours, the polymer that is produced is coagulated in 200 ml of ethanol acidified with HCl, filtered and dried in a vacuum oven.

The yield is about 500 mg.

According to ¹³C-NMR analysis, the polymer consists essentially of isotactic polypropylene and contains 0.7% by mole of p-methylstyrene units and 0.9% by mole of ethylene units (of which 0.7% are associated with the p-methylstyrene units, $X_s$=0.7).

According to differential scanning calorimetric analysis, carried out at a scanning rate of 10 K/min, the polymer is characterized by a melting temperature of 134° C. ($\Delta H_f$=85 J/g).

It is interesting to note that the isotactic polypropylene, obtained under the same conditions with this catalyst system, shows a melting temperature of 151° C. ($\Delta H_f$=95 J/g).

EXAMPLE 5

The catalyst system employed, the operating method and the reaction conditions are identical with those of Example 4, except for the fact that divinyl benzene is used instead of p-methyl-styrene and the composition of the propylene/ethylene mixture is 75/1 mol/mol.

The yield is about 500 mg.

According to ¹³C-NMR analysis, the polymer consists essentially of isotactic polypropylene and contains 0.7% by mole divinylbenzene units and 0.7% by mole of associated ethylene units ($X_s$=0.007).

According to differential scanning calorimetric analysis, carried out at a scanning rate of 10 K/min, the polymer is characterized by a melting temperature of 131° C. ($\Delta H_f$=90 J/g).

What is claimed is:

1. Isotactic-polypropylene-based copolymers having a homogenous distribution of recurring units of the formula (1):

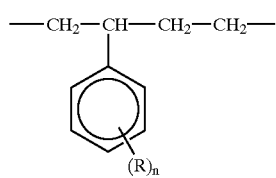

where R is a hydrogen, halide radical or a hydrocarbyl radical optionally containing an atom selected from oxygen, nitrogen, sulphur, phosphorus and silicon and n is an integer ranging from 1 to 3; said copolymer having a $^{13}$C-NMR spectrum wherein the resonance signals attributed to links between the recurring units of formula (1) fall around 30, 34, 35, 45 and 47 ppm and have intensities at least two times higher than the resonance signals attributed to styrene—styrene sequences around 41 ppm and 44–46 ppm.

2. The copolymers of claim 1 wherein the content of recurring units of formula (1) ranges from 0.1 to 30% by weight.

3. The copolymers of claim 1 having the polymerisation degree of at least 50.

4. The copolymers of claim 1 wherein R is selected from the group consisting of linear or branched $C_1$–$C_{20}$ alkyl radicals, $C_3$–$C_{20}$ cycloalkyl radicals and $C_6$–$C_{20}$ aryl radicals, whe0rein the alkyl radicals can be saturated or unsaturated radicals.

5. The copolymers of claim 4 wherein R is selected from methyl, ethyl, isopropyl, vinyl and allyl radicals.

6. The copolymers of claims 1 or 4, wherein the R substituent contains a functional group.

7. The copolymers of claim 1 wherein the content of meso diads (m) is higher than 80%.

8. A process for preparing the copolymer of claim 1 carried out in the presence of homogeneous catalytic systems comprising a metallocene compound and a cocatalyst.

9. Functionalized copolymers obtained from the isotactic polypropylene-based copolymers of claim 1.

10. Graft copolymers comprising isotactic-polypropylene-based copolymers of claim 1 as backbones.

11. The graft copolymers of claim 10 selected from the group consisting of polystyrene, poly(vinyl acetate), polymethacrylate, poly(methyl methacrylate), and polyacrylonitrile, grafted onto the isotactic polypropylene-based copolymer.

* * * * *